(12) United States Patent
Nakamoto

(10) Patent No.: US 11,962,913 B2
(45) Date of Patent: Apr. 16, 2024

(54) IMAGING DEVICE COMPRISING SPATIAL LIGHT MODULATOR AND IMAGING METHOD THEREOF

(71) Applicant: HAMAMATSU PHOTONICS K.K., Hamamatsu (JP)

(72) Inventor: Katsuhiro Nakamoto, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 154 days.

(21) Appl. No.: 17/778,185

(22) PCT Filed: Dec. 7, 2020

(86) PCT No.: PCT/JP2020/045530
§ 371 (c)(1),
(2) Date: May 19, 2022

(87) PCT Pub. No.: WO2021/131649
PCT Pub. Date: Jul. 1, 2021

(65) Prior Publication Data
US 2022/0417407 A1    Dec. 29, 2022

(30) Foreign Application Priority Data

Dec. 25, 2019   (JP) .................................. 2019-234722

(51) Int. Cl.
*H04N 23/72*    (2023.01)
*G02B 26/08*   (2006.01)
(Continued)

(52) U.S. Cl.
CPC ............ *H04N 23/72* (2023.01); *H04N 23/56* (2023.01); *H04N 23/71* (2023.01); *H04N 23/75* (2023.01);
(Continued)

(58) Field of Classification Search
CPC ........ H04N 23/54; H04N 23/55; H04N 23/56; H04N 23/57; H04N 23/71; H04N 23/72;
(Continued)

(56) References Cited

U.S. PATENT DOCUMENTS

2006/0239336 A1* 10/2006 Baraniuk ................ H04L 25/20
375/216
2014/0198236 A1* 7/2014 Herman ................. H04N 25/00
348/239

(Continued)

FOREIGN PATENT DOCUMENTS

CN    105467806 A    4/2016
CN    110231292 A    9/2019
(Continued)

OTHER PUBLICATIONS

International Preliminary Report on Patentability dated Jul. 7, 2022 for PCT/JP2020/045530.
(Continued)

*Primary Examiner* — Twyler L Haskins
*Assistant Examiner* — Akshay Trehan
(74) *Attorney, Agent, or Firm* — Faegre Drinker Biddle & Reath LLP

(57) ABSTRACT

An imaging apparatus includes a light source, a spatial light modulator, a Fourier transform optical system, a photodetector, and a control unit. The control unit sets a first region and a second region on a modulation plane, acquires a light intensity value by setting a light amplitude modulation pattern in the first region and setting a light amplitude modulation in the second region to a non-zero predetermined value, acquires the light intensity value by setting the light amplitude modulation pattern in the first region and setting the light amplitude modulation in the second region to zero, acquires the light intensity value by setting the light
(Continued)

amplitude modulation in the first region to zero and setting the light amplitude modulation in the second region to the predetermined value, and acquires a complex amplitude image of a region of an object corresponding to the first region.

28 Claims, 8 Drawing Sheets

(51) Int. Cl.
  G02F 1/13       (2006.01)
  G02F 1/15       (2019.01)
  G03B 11/04      (2021.01)
  H04N 23/54      (2023.01)
  H04N 23/55      (2023.01)
  H04N 23/56      (2023.01)
  H04N 23/57      (2023.01)
  H04N 23/71      (2023.01)
  H04N 23/75      (2023.01)
(52) U.S. Cl.
  CPC ............ G02B 26/0833 (2013.01); G02F 1/13 (2013.01); G02F 1/15 (2013.01); G02F 2201/44 (2013.01); G02F 2203/12 (2013.01); G03B 11/045 (2013.01); H04N 23/54 (2023.01); H04N 23/55 (2023.01); H04N 23/57 (2023.01)

(58) Field of Classification Search
  CPC ....... H04N 23/75; G02F 2203/12; G02F 1/13; G02F 1/15; G02F 2201/44; G03B 11/045; G02B 26/0833
  See application file for complete search history.

(56) References Cited

U.S. PATENT DOCUMENTS

2015/0054979 A1* 2/2015 Ou ................... G02B 21/125
                                                348/222.1
2016/0276050 A1* 9/2016 Stevens ............. H01J 37/222
2017/0273551 A1* 9/2017 Chung ............... G06T 11/003

FOREIGN PATENT DOCUMENTS

JP      2015-036799 A    2/2015
WO   WO-2014/064636 A2   5/2014

OTHER PUBLICATIONS

Takhar, Dharmpal et al., "A New Compressive Imaging Camera Architecture using Optical-Domain Compression," Proc. IS&T/SPIE Computational Imaging IV, 2006.
Ota, Kazuki et al., "Complex-amplitude single-pixel imaging," Opt. Lett., vol. 43, No. 15, 2018, pp. 3682-3685.

* cited by examiner

*Fig.4*

|  | S1 | | | | S2 | | |
|---|---|---|---|---|---|---|---|
| $X_1$ | $X_2$ | $X_3$ | $X_4$ | $X_5$ | $X_6$ | $X_7$ | $X_8$ |
| $X_9$ | $X_{10}$ | $X_{11}$ | $X_{12}$ | $X_{13}$ | $X_{14}$ | $X_{15}$ | $X_{16}$ |
| $X_{17}$ | $X_{18}$ | $X_{19}$ | $X_{20}$ | $X_{21}$ | $X_{22}$ | $X_{23}$ | $X_{24}$ |
| $X_{25}$ | $X_{26}$ | $X_{27}$ | $X_{28}$ | $X_{29}$ | $X_{30}$ | $X_{31}$ | $X_{32}$ |
| $X_{33}$ | $X_{34}$ | $X_{35}$ | $X_{36}$ | $X_{37}$ | $X_{38}$ | $X_{39}$ | $X_{40}$ |
| $X_{41}$ | $X_{42}$ | $X_{43}$ | $X_{44}$ | $X_{45}$ | $X_{46}$ | $X_{47}$ | $X_{48}$ |
| $X_{49}$ | $X_{50}$ | $X_{51}$ | $X_{52}$ | $X_{53}$ | $X_{54}$ | $X_{55}$ | $X_{56}$ |
| $X_{57}$ | $X_{58}$ | $X_{59}$ | $X_{60}$ | $X_{61}$ | $X_{62}$ | $X_{63}$ | $X_{64}$ |

*Fig.6*

|  | S1 | | | | S2 | | | |
|---|---|---|---|---|---|---|---|---|
| $g_{k,1}$ | $g_{k,2}$ | $g_{k,3}$ | $g_{k,4}$ | | | | |
| $g_{k,9}$ | $g_{k,10}$ | $g_{k,11}$ | $g_{k,12}$ | | | | |
| $g_{k,17}$ | $g_{k,18}$ | $g_{k,19}$ | $g_{k,20}$ | | | | |
| $g_{k,25}$ | $g_{k,26}$ | $g_{k,27}$ | $g_{k,28}$ | | | | |
| $g_{k,33}$ | $g_{k,34}$ | $g_{k,35}$ | $g_{k,36}$ | | | | |
| $g_{k,41}$ | $g_{k,42}$ | $g_{k,43}$ | $g_{k,44}$ | | | | |
| $g_{k,49}$ | $g_{k,50}$ | $g_{k,51}$ | $g_{k,52}$ | | | | |
| $g_{k,57}$ | $g_{k,58}$ | $g_{k,59}$ | $g_{k,60}$ | | | | |

(a)

(b)

(a)

(b)

IMAGING DEVICE COMPRISING SPATIAL LIGHT MODULATOR AND IMAGING METHOD THEREOF

TECHNICAL FIELD

The present disclosure relates to an imaging apparatus and an imaging method.

BACKGROUND ART

An imaging apparatus described in Patent Document 1 and Non Patent Document 1 can acquire an image of an object by using a digital micromirror device (DMD) as a spatial light modulator capable of modulating an intensity ratio of output light to input light in each pixel and using a photodetector for detecting an intensity of the input light.

In the imaging apparatus described in these documents, the image of the object is formed on a modulation plane of the DMD, light amplitude modulation is performed in each pixel by the DMD based on a set light amplitude modulation pattern, and an intensity of the modulated light is detected by the photodetector. A plurality of types of light amplitude modulation patterns are sequentially set in the DMD, the photodetector acquires a light intensity value when each light amplitude modulation pattern is set, and a storage unit stores each light amplitude modulation pattern and the corresponding light intensity value. Further, by analyzing the plurality of sets of light amplitude modulation patterns and light intensity values stored in the storage unit, the image of the object can be acquired.

Further, an imaging apparatus described in Non Patent Document 2 can acquire a complex amplitude image of an object by using a spatial light modulator capable of modulating a phase of light in each pixel and a photodetector for detecting an intensity of input light.

In the imaging apparatus described in this document, the image of the object is formed on a modulation plane of the spatial light modulator, light phase modulation is performed in each pixel by the spatial light modulator based on a set light phase modulation pattern, and an intensity of the modulated light is detected by the photodetector. A plurality of types of light phase modulation patterns are sequentially set in the spatial light modulator, the photodetector acquires a light intensity value when each light phase modulation pattern is set, and a storage unit stores each light phase modulation pattern and the corresponding light intensity value. Further, by analyzing the plurality of sets of light phase modulation patterns and light intensity values stored in the storage unit, the complex amplitude image of the object can be acquired.

The photodetector used in the above imaging apparatus does not need to be an image sensor in which a plurality of pixels are arranged for detecting an intensity distribution in a beam cross-section of input light, and may be a point sensor with a single pixel. Therefore, when it is required to image an object in a wavelength range in which use of an image sensor is not appropriate, or when it is required to image an object with lower noise or higher performance than the image sensor, imaging by an imaging apparatus using a point sensor is effective.

CITATION LIST

Patent Literature

Patent Document 1: US Patent Application Publication No. 2006/0239336

Non Patent Literature

Non Patent Document 1: Dharmpal Takhar et al., "A New Compressive Imaging Camera Architecture using Optical-Domain Compression", Proc. IS&T/SPIE Computational Imaging IV, 2006

Non Patent Document 2: Kazuki Ota, Yoshio Hayasaki, "Complex-amplitude single-pixel imaging", Opt. Lett., Vol. 43 No. 15, pp. 3682-3685, 2018

SUMMARY OF INVENTION

Technical Problem

The imaging apparatus described in Non Patent Document 2 acquires the complex amplitude image of the object by a phase shift method using a partial region of the modulation plane of the spatial light modulator as a reference region. Thus, the number of pixels of the acquired complex amplitude image is reduced, and resolution of the complex amplitude image is lowered.

An object of the present invention is to provide an imaging apparatus and an imaging method capable of acquiring a complex amplitude image of an object with high resolution using a spatial light modulator and a photodetector.

Solution to Problem

An embodiment of the present invention is an imaging apparatus. The imaging apparatus includes (1) a light source for outputting coherent light; (2) a spatial light modulator having a modulation plane on which an image of an object irradiated with output light from the light source is formed, and for performing light amplitude modulation on input light in each of a plurality of pixel regions on the modulation plane based on a set light amplitude modulation pattern and outputting modulated light; (3) a Fourier transform optical system for forming a Fourier transform image of output light from the spatial light modulator; (4) a photodetector for selectively receiving zero-order light in the Fourier transform image to detect a light intensity and outputting a light intensity value; and (5) a control unit for controlling setting of the light amplitude modulation pattern on the modulation plane of the spatial light modulator and acquiring a complex amplitude image of the object based on the light amplitude modulation pattern and the light intensity value, and the control unit is configured to (a) set a first region and a second region on the modulation plane of the spatial light modulator, (b) in an image acquisition of the first region, sequentially set a plurality of light amplitude modulation patterns in the first region, and for each light amplitude modulation pattern, acquire the light intensity value by setting the light amplitude modulation pattern in the first region and setting the light amplitude modulation in a region other than the first region uniformly to a non-zero predetermined value, acquire the light intensity value by setting the light amplitude modulation pattern in the first region and setting the light amplitude modulation in the region other than the first region uniformly to zero, acquire the light intensity value by setting the light amplitude modulation in the first region uniformly to zero and setting the light amplitude modulation in the region other than the first region uniformly to the predetermined value, and acquire a complex amplitude image of a region of the object corresponding to the first region based on the acquired light intensity values and the light amplitude modulation pattern, and (c) in an image acquisition of the second region, sequentially set a plurality of light amplitude modulation patterns in the second region, and for each light amplitude modulation pattern, acquire the light intensity value by setting the light amplitude modulation pattern in the second region and setting the light amplitude modulation in a region other than the second region uniformly to a non-zero predetermined value, acquire the light intensity value by setting the light amplitude modulation pattern in the second region and setting the light amplitude modulation in the region other than the second region uniformly to zero, acquire the light intensity value by setting the light amplitude modulation in the second region uniformly to zero and setting the light amplitude modulation in the region other than the second region uniformly to the predetermined value, and acquire a complex amplitude image of a region of the object corresponding to the second region based on the acquired light intensity values and the light amplitude modulation pattern.

An embodiment of the present invention is an imaging apparatus. The imaging apparatus includes (1) a light source for outputting coherent light; (2) a spatial light modulator having a modulation plane to which output light from the light source is input, and for performing light amplitude modulation on input light in each of a plurality of pixel regions on the modulation plane based on a set light amplitude modulation pattern and outputting modulated light; (3) a Fourier transform optical system for forming a Fourier transform image of an object irradiated with output light from the spatial light modulator; (4) a photodetector for selectively receiving zero-order light in the Fourier transform image to detect a light intensity and outputting a light intensity value; and (5) a control unit for controlling setting of the light amplitude modulation pattern on the modulation plane of the spatial light modulator and acquiring a complex amplitude image of the object based on the light amplitude modulation pattern and the light intensity value, and the control unit is configured to (a) set a first region and a second region on the modulation plane of the spatial light modulator, (b) in an image acquisition of the first region, sequentially set a plurality of light amplitude modulation patterns in the first region, and for each light amplitude modulation pattern, acquire the light intensity value by setting the light amplitude modulation pattern in the first region and setting the light amplitude modulation in a region other than the first region uniformly to a non-zero predetermined value, acquire the light intensity value by setting the light amplitude modulation pattern in the first region and setting the light amplitude modulation in the region other than the first region uniformly to zero, acquire the light intensity value by setting the light amplitude modulation in the first region uniformly to zero and setting the light amplitude modulation in the region other than the first region uniformly to the predetermined value, and acquire a complex amplitude image of a region of the object corresponding to the first region based on the acquired light intensity values and the light amplitude modulation pattern, and (c) in an image acquisition of the second region, sequentially set a plurality of light amplitude modulation patterns in the second region, and for each light amplitude modulation pattern, acquire the light intensity value by setting the light amplitude modulation pattern in the second region and setting the light amplitude modulation in a region other than the second region uniformly to a non-zero predetermined value, acquire the light intensity value by setting the light amplitude modulation pattern in the second region and setting the light amplitude modulation in the region other than the second region uniformly to zero, acquire the light intensity value by setting the light amplitude modulation in the second region uniformly to zero and setting the light amplitude modulation in the region other than the second region uniformly to the predetermined value, and acquire a complex amplitude image of a region of the object corresponding to the second region based on the acquired light intensity values and the light amplitude modulation pattern.

An embodiment of the present invention is an imaging method. The imaging method is a method for imaging an object using (1) a light source for outputting coherent light; (2) a spatial light modulator having a modulation plane on which an image of the object irradiated with output light from the light source is formed, and for performing light amplitude modulation on input light in each of a plurality of pixel regions on the modulation plane based on a set light amplitude modulation pattern and outputting modulated light; (3) a Fourier transform optical system for forming a Fourier transform image of output light from the spatial light modulator; and (4) a photodetector for selectively receiving zero-order light in the Fourier transform image to detect a light intensity and outputting a light intensity value, and includes (a) a region setting step of setting a first region and a second region on the modulation plane of the spatial light modulator; (b) a first region image acquisition step of sequentially setting a plurality of light amplitude modulation patterns in the first region, and for each light amplitude modulation pattern, acquiring the light intensity value by setting the light amplitude modulation pattern in the first region and setting the light amplitude modulation in a region other than the first region uniformly to a non-zero predetermined value, acquiring the light intensity value by setting the light amplitude modulation pattern in the first region and setting the light amplitude modulation in the region other than the first region uniformly to zero, acquiring the light intensity value by setting the light amplitude modulation in the first region uniformly to zero and setting the light amplitude modulation in the region other than the first region uniformly to the predetermined value, and acquiring a complex amplitude image of a region of the object corresponding to the first region based on the acquired light intensity values and the light amplitude modulation pattern; and (c) a second region image acquisition step of sequentially setting a plurality of light amplitude modulation patterns in the second region, and for each light amplitude modulation pattern, acquiring the light intensity value by setting the light amplitude modulation pattern in the second region and setting the light amplitude modulation in a region other than the second region uniformly to a non-zero predetermined value, acquiring the light intensity value by setting the light amplitude modulation pattern in the second region and setting the light amplitude modulation in the region other than the second region uniformly to zero, acquiring the light intensity value by setting the light amplitude modulation in the second region uniformly to zero and setting the light amplitude modulation in the region other than the second region uniformly to the predetermined value, and acquiring a complex amplitude image of a region of the object corresponding to the second region based on the acquired light intensity values and the light amplitude modulation pattern.

An embodiment of the present invention is an imaging method. The imaging method is a method for imaging an object using (1) a light source for outputting coherent light; (2) a spatial light modulator having a modulation plane to which output light from the light source is input, and for performing light amplitude modulation on input light in each of a plurality of pixel regions on the modulation plane based on a set light amplitude modulation pattern and outputting modulated light; (3) a Fourier transform optical system for forming a Fourier transform image of the object irradiated with output light from the spatial light modulator; and (4) a photodetector for selectively receiving zero-order light in the Fourier transform image to detect a light intensity and outputting a light intensity value, and includes (a) a region setting step of setting a first region and a second region on the modulation plane of the spatial light modulator; (b) a first region image acquisition step of sequentially setting a plurality of light amplitude modulation patterns in the first region, and for each light amplitude modulation pattern, acquiring the light intensity value by setting the light amplitude modulation pattern in the first region and setting the light amplitude modulation in a region other than the first region uniformly to a non-zero predetermined value, acquiring the light intensity value by setting the light amplitude modulation pattern in the first region and setting the light amplitude modulation in the region other than the first region uniformly to zero, acquiring the light intensity value by setting the light amplitude modulation in the first region uniformly to zero and setting the light amplitude modulation in the region other than the first region uniformly to the predetermined value, and acquiring a complex amplitude image of a region of the object corresponding to the first region based on the acquired light intensity values and the light amplitude modulation pattern; and (c) a second region image acquisition step of sequentially setting a plurality of light amplitude modulation patterns in the second region, and for each light amplitude modulation pattern, acquiring the light intensity value by setting the light amplitude modulation pattern in the second region and setting the light amplitude modulation in a region other than the second region uniformly to a non-zero predetermined value, acquiring the light intensity value by setting the light amplitude modulation pattern in the second region and setting the light amplitude modulation in the region other than the second region uniformly to zero, acquiring the light intensity value by setting the light amplitude modulation in the second region uniformly to zero and setting the light amplitude modulation in the region other than the second region uniformly to the predetermined value, and acquiring a complex amplitude image of a region of the object corresponding to the second region based on the acquired light intensity values and the light amplitude modulation pattern.

Advantageous Effects of Invention

According to the embodiments of the present invention, it is possible to acquire a complex amplitude image of an object with high resolution using a spatial light modulator and a photodetector.

BRIEF DESCRIPTION OF DRAWINGS

FIG. 4 is a diagram illustrating a setting example of a first region S1 and a second region S2 on a modulation plane of a spatial light modulator.

FIG. 6 is a diagram illustrating a k-th light amplitude modulation pattern $g_{k,i}$ in the first region S1 on the modulation plane of the spatial light modulator.

DESCRIPTION OF EMBODIMENTS

Hereinafter, embodiments of an imaging apparatus and an imaging method will be described in detail with reference to the accompanying drawings. In the description of the drawings, the same elements will be denoted by the same reference signs, and redundant description will be omitted. The present invention is not limited to these examples.

Figure 1:
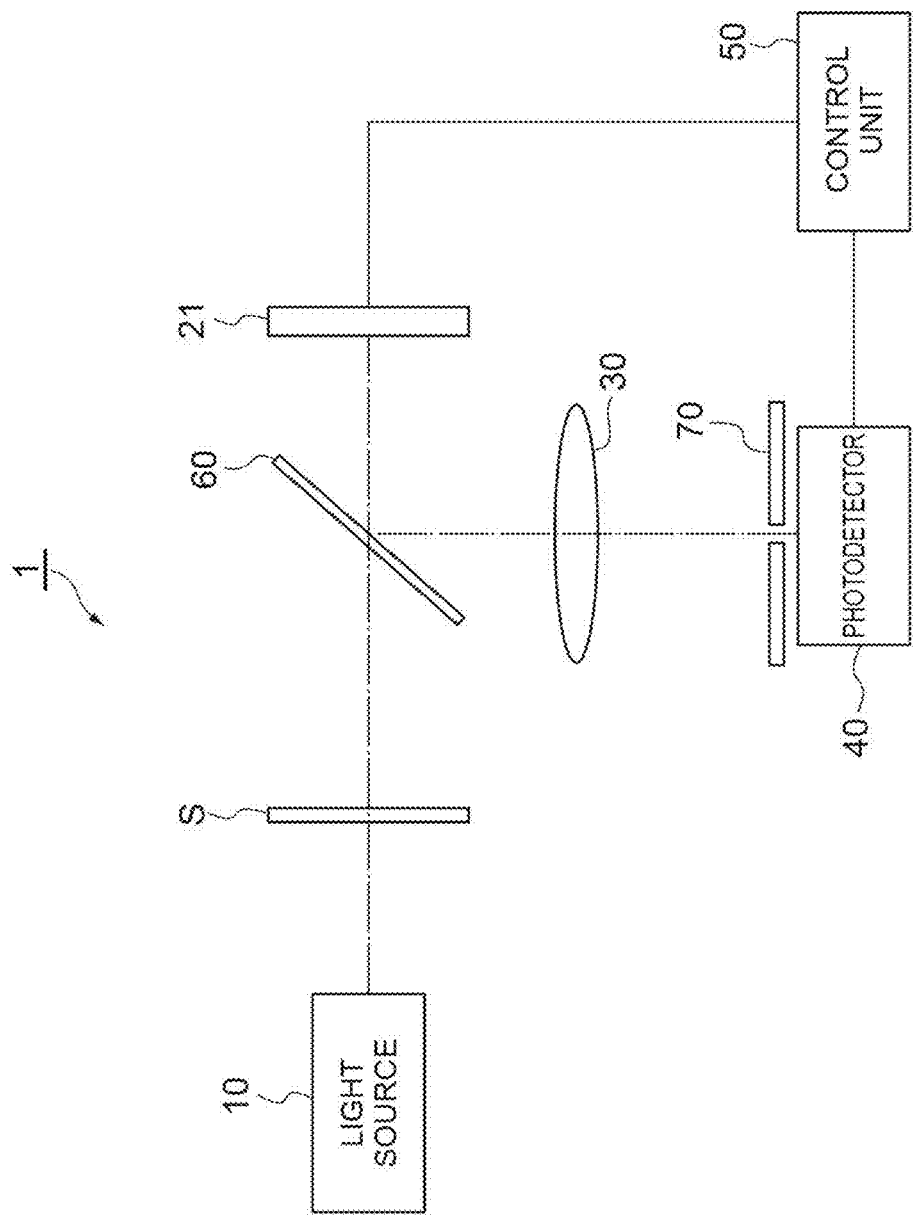
FIG. 1 is a diagram illustrating a configuration of an imaging apparatus 1.

FIG. 1 is a diagram illustrating a configuration of an imaging apparatus 1. The imaging apparatus 1 includes a light source 10, a spatial light modulator 21, a Fourier transform optical system 30, a photodetector 40, a control unit 50, a beam splitter 60, and an aperture 70. The imaging apparatus 1 can acquire a phase image of an object S, and can further acquire an amplitude image of the object S. That is, the imaging apparatus 1 can acquire a complex amplitude image.

The light source 10 is a light source for outputting coherent light with which the object S is irradiated, and is preferably a laser light source. A wavelength of the light output from the light source 10 may be any wavelength as long as light amplitude modulation can be performed by the spatial light modulator 21 and the photodetector 40 has sensitivity. The output light from the light source 10 is applied to the object S. A beam expander for expanding a beam diameter of the output light from the light source 10 may be provided between the light source 10 and the object S. The light transmitted through the object S is transmitted through the beam splitter 60 and reaches a modulation plane of the spatial light modulator 21.

An imaging optical system for forming an image of the object S on the modulation plane of the spatial light modulator 21 may be provided between the object S and the modulation plane of the spatial light modulator 21. When the light reaching the modulation plane of the spatial light modulator 21 from the object S propagates while maintaining the image, the imaging optical system is unnecessary.

The spatial light modulator 21 has the modulation plane on which the image of the object S irradiated with the output light from the light source 10 is formed. A plurality of pixel regions are arranged on the modulation plane, and light can be output by performing light amplitude modulation on input light in each pixel region. The spatial light modulator 21 performs the light amplitude modulation on the input light in each of the plurality of pixel regions on the modulation plane based on a set light amplitude modulation pattern and outputs modulated light. The spatial light modulator 21 illustrated in this figure is of a reflection type.

The spatial light modulator 21 may perform three or more valued light amplitude modulation, or may perform binary light amplitude modulation. In the latter case, the spatial light modulator 21 may be a digital micromirror device (DMD). As compared with the case of using a spatial light modulator for performing light amplitude modulation by liquid crystal, high-speed imaging is possible in the case of using the DMD.

Further, the spatial light modulator 21 may have a configuration including a spatial light modulator (for example, a liquid crystal on silicon spatial light modulator (LCOS-SLM)) having a modulation plane on which a plurality of pixel regions, each of which performs different light phase modulation according to a polarization direction of input light and outputs the light, are arranged, and two polarizers with crossed Nicols arrangement.

The output light from the spatial light modulator 21 is reflected by the beam splitter 60 and reaches the Fourier transform optical system 30. The Fourier transform optical system 30 forms a Fourier transform image of the output light from the spatial light modulator 21. The photodetector 40 selectively receives zero-order light out of the Fourier transform image, detects a light intensity thereof, and outputs a light intensity value.

The photodetector 40 does not need to be an image sensor, but may be a point sensor. A light receiving region of the photodetector 40 may have a size for selectively receiving the zero-order light in the Fourier transform image, or may have a size larger than the above. In the latter case, the aperture 70 may be provided at a position where the Fourier transform image is formed by the Fourier transform optical system 30, the zero-order light in the Fourier transform image may be selectively transmitted through the aperture 70, and the photodetector 40 may receive the light transmitted through the aperture 70.

The control unit 50 controls setting of the light amplitude modulation pattern on the modulation plane of the spatial light modulator 21, and acquires the complex amplitude image of the object S based on the light amplitude modulation pattern and the light intensity value. The processing of the control unit 50 will be described in detail later.

Figure 2:
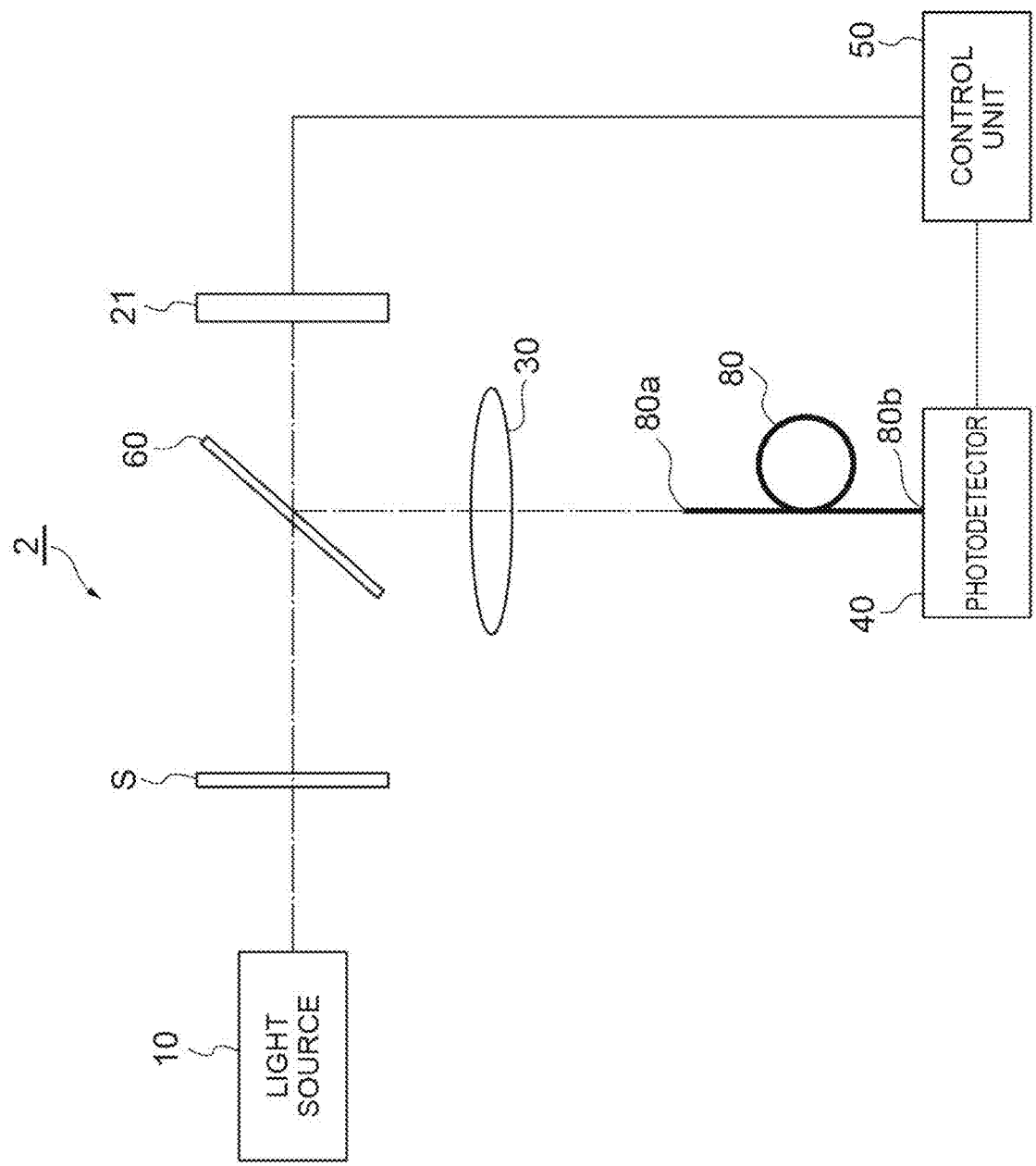
FIG. 2 is a diagram illustrating a configuration of an imaging apparatus 2.

FIG. 2 is a diagram illustrating a configuration of an imaging apparatus 2. As compared with the configuration of the imaging apparatus 1 illustrated in FIG. 1, the imaging apparatus 2 illustrated in FIG. 2 is different in that an optical fiber 80 is provided in place of the aperture 70. An input end 80a of the optical fiber 80, being an optical waveguide, is disposed at a position of the zero-order light in the Fourier transform image formed by the Fourier transform optical system 30, and the zero-order light is selectively input. The optical fiber 80 guides the light input to the input end 80a and outputs the light from an output end 80b. The photodetector 40 receives the light output from the output end 80b of the optical fiber 80. In this case also, the light receiving region of the photodetector 40 may be large.

Figure 3:
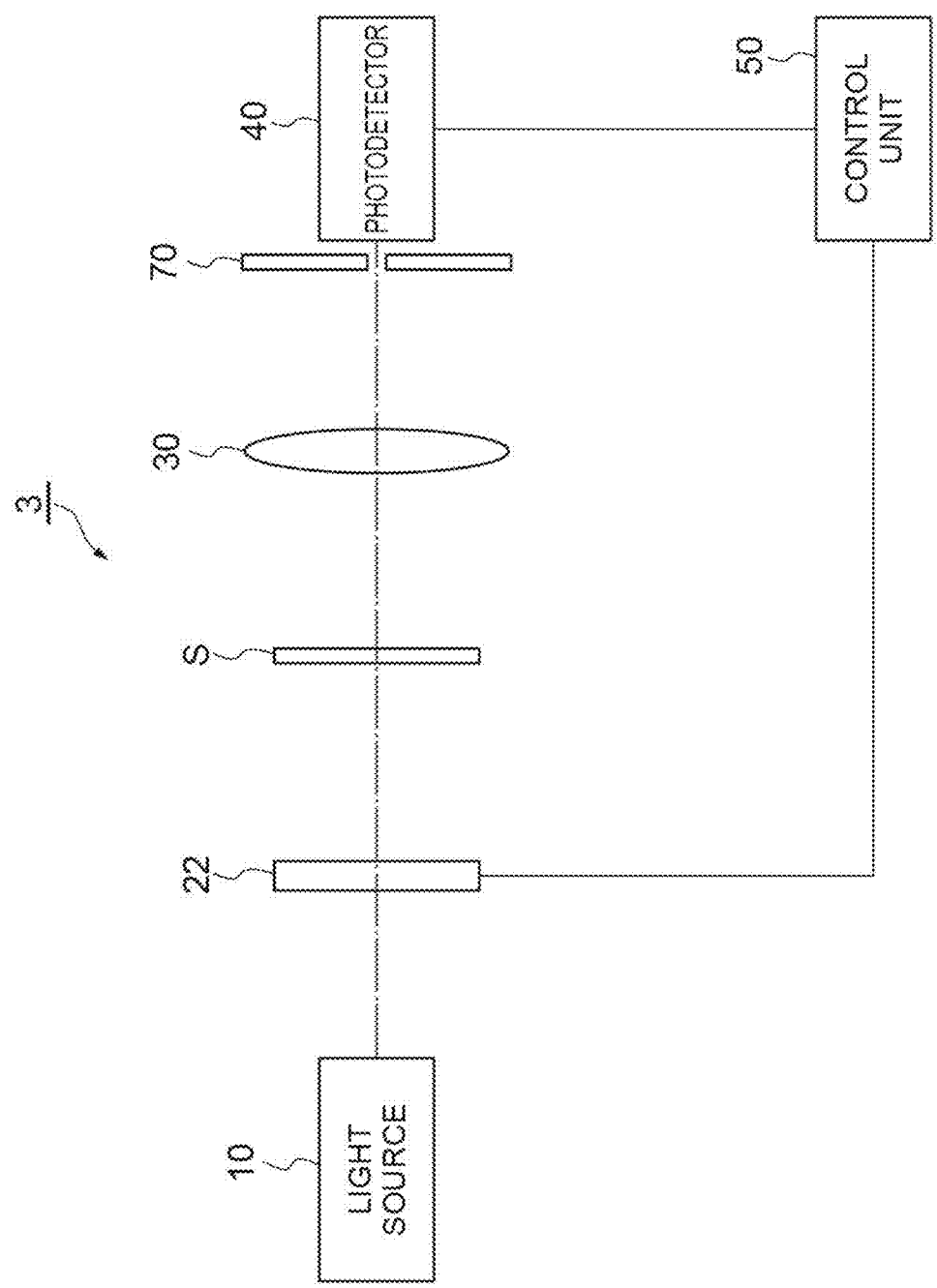
FIG. 3 is a diagram illustrating a configuration of an imaging apparatus 3.

FIG. 3 is a diagram illustrating a configuration of an imaging apparatus 3. As compared with the configuration of the imaging apparatus 1 illustrated in FIG. 1, the imaging apparatus 3 illustrated in FIG. 3 is different in that a spatial light modulator 22 of a transmission type is provided in place of the spatial light modulator 21 of the reflection type, thereby eliminating the need for the beam splitter 60. Further, as compared with the configuration of the imaging apparatus 1 illustrated in FIG. 1, the imaging apparatus 3 illustrated in FIG. 3 is different in that the object S is disposed in the subsequent stage of the spatial light modulator 22.

In the above configuration, the spatial light modulator 22 has the modulation plane to which the output light from the light source 10 is input, performs the light amplitude modulation on the input light in each of the plurality of pixel regions on the modulation plane based on the set light amplitude modulation pattern, and outputs the modulated light to the object S. The Fourier transform optical system 30 forms the Fourier transform image of the object S irradiated with the output light from the spatial light modulator 22.

In addition, the optical system of the imaging apparatus can take various configurations. For example, the optical fiber 80 may be provided in place of the aperture 70 in the configuration of FIG. 3. Instead of acquiring the complex amplitude image based on the light transmitted through the object S from one side to the other side, the complex amplitude image may be acquired based on the light reflected by a mirror disposed behind the object S (that is, the light that has reciprocated inside the object S).

Next, the light intensity value output from the photodetector 40 will be described. Variables representing a position on a two-dimensional orthogonal coordinate system on the modulation plane of the spatial light modulator are set to and and variables representing a position on a two-dimensional orthogonal coordinate system on the plane on which the Fourier transform image is formed are set to x and y. The light amplitude modulation distribution set on the modulation plane is set to $g(\xi,\eta)$.

In FIG. 1, a complex amplitude distribution of the light reaching the modulation plane of the spatial light modulator is represented by the following Formula (1), and a complex amplitude distribution of the light modulated and output by the spatial light modulator is represented by the following Formula (2). A complex amplitude distribution of the Fourier transform image formed by the Fourier transform optical system 30 is represented by the following Formula (3). Here, a scale factor is ignored. j is an imaginary unit.

[Formula 1]

$$\alpha(\xi,\eta)\cdot\exp(j\theta(\xi,\eta)) \tag{1}$$

[Formula 2]

$$\alpha(\xi,\eta)\cdot\exp(j\theta(\xi,\eta))\cdot g(\xi,\eta) \tag{2}$$

[Formula 3]

$$\int \alpha(\xi,\eta)\cdot\exp(j\theta(\xi,\eta))\cdot g(\xi,\eta)\cdot\exp(-j(x\xi+y\eta))\cdot d\xi d\eta \tag{3}$$

A complex amplitude of the zero-order light in the Fourier transform image is acquired by setting x=y=0 in Formula (3), and is represented by the following Formula (4). The light intensity value output from the photodetector 40 is represented by the following Formula (5) as the absolute value of Formula (4). Practically, the plurality of pixel regions are discretely arranged on the modulation plane of the spatial light modulator, and thus, the following Formula (6) of the summation format is used instead of Formula (5) of the integration format. Here also, a scale factor is ignored. A subscript i represents the i-th pixel region in the plurality of pixel regions.

[Formula 4]

$$\int a(\xi,\eta)\cdot\exp(j\theta(\xi,\eta))\cdot g(\xi,\eta)\cdot d\xi d\eta \tag{4}$$

[Formula 5]

$$\left|\int a(\xi,\eta)\cdot\exp(j\theta(\xi,\eta))\cdot g(\xi,\eta)\cdot d\xi d\eta\right|^2 \tag{5}$$

[Formula 6]

$$\left|\sum_i a_i\cdot\exp(j\theta_i)\cdot g_i\right|^2 \tag{6}$$

Figure 5:
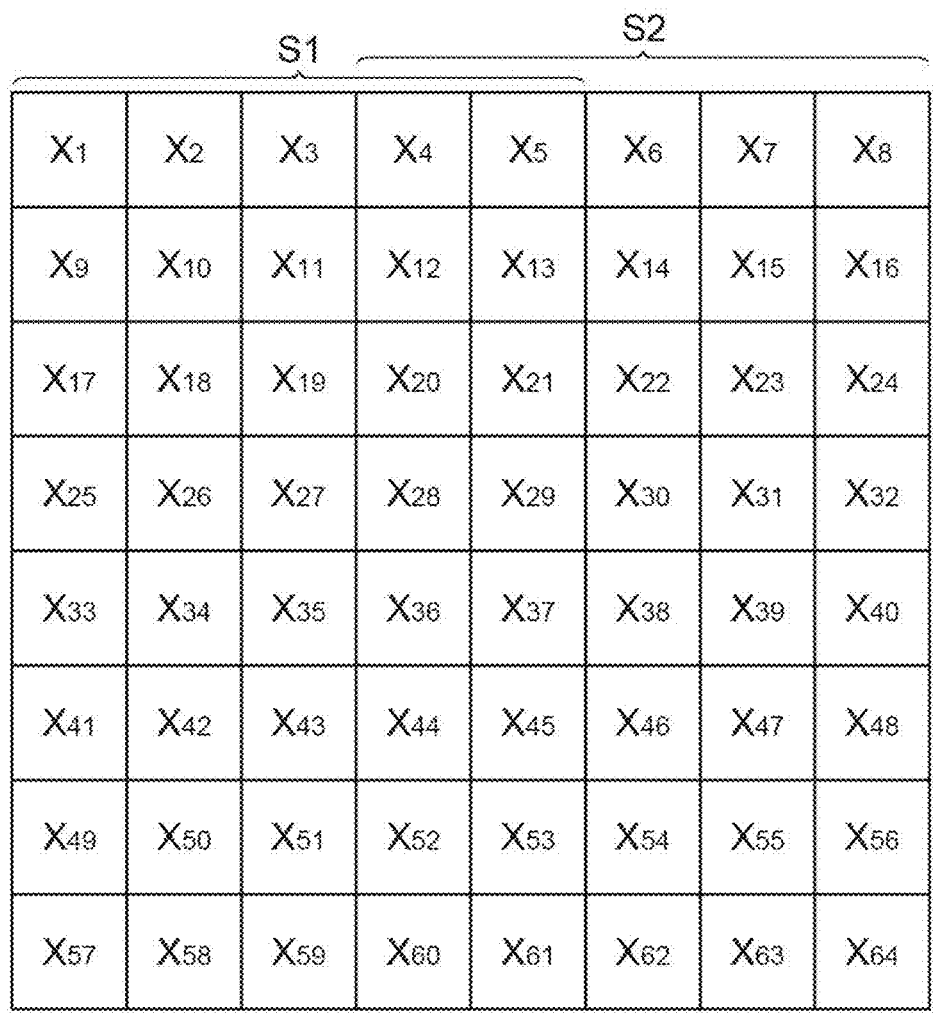
FIG. 5 is a diagram illustrating another setting example of the first region S1 and the second region S2 on the modulation plane of the spatial light modulator.

Next, the processing in the control unit 50 will be described. The control unit 50 sets a first region S1 and a second region S2 on the modulation plane of the spatial light modulator (region setting step). FIG. 4 and FIG. 5 are diagrams illustrating setting examples of the first region S1 and the second region S2 on the modulation plane of the spatial light modulator. In these figures, assuming that the modulation plane of the spatial light modulator includes 64 (=8×8) pixel regions, the complex amplitude of the light reaching the i-th pixel region in the 64 pixel regions is represented by $x_i$. The complex amplitude $x_i$ of the light reaching the i-th pixel region is represented by the following Formula (7).

$$x_i = \alpha_i \cdot \exp(j\theta_i) \quad (7)$$

The first region S1 and the second region S2 may be set arbitrarily. For example, as illustrated in FIG. 4, a rectangular region including the 32 (=8×4) pixel regions may be set as the first region S1, and a rectangular region including the remaining 32 (=8×4) pixel regions may be set as the second region S2. Further, as illustrated in FIG. 5, a rectangular region including the 40 (=8×5) pixel regions may be set as the first region S1, and a rectangular region including the 40 (=8×5) pixel regions may be set as the second region S2, and in this case, the 16 pixel regions may be included in both the first region S1 and the second region S2.

Further, each of the first region S1 and the second region S2 may not be a rectangular region, and further, may include a plurality of partial regions instead of a single region. Hereinafter, as illustrated in FIG. 4, a case where each pixel region is included in one of the first region S1 and the second region S2 will be described.

The control unit 50 acquires the complex amplitude image of a region of the object S corresponding to the first region S1 (first region image acquisition step), and acquires the complex amplitude image of a region of the object S corresponding to the second region S2 (second region image acquisition step).

The processing in the first region image acquisition step is as follows. A plurality of light amplitude modulation patterns are sequentially set in the first region S1. The number of light amplitude modulation patterns to be set is preferably 32, which is the same number as the number of pixel regions included in the first region S1. The k-th light amplitude modulation pattern in the plurality of light amplitude modulation patterns set in the first region S1 is represented as $g_{k,i}$. FIG. 6 is a diagram illustrating the k-th light amplitude modulation pattern $g_{k,i}$ in the first region S1 on the modulation plane of the spatial light modulator. The complex amplitude of the modulated light output from the i-th pixel region in the first region S1 is represented by the following Formula (8). The sum of the complex amplitudes of the modulated light output from all the pixel regions in the first region S1 is expressed by the following Formula (9).

[Formula 8]

$$x_i \cdot g_{k,i} = a_i \cdot \exp(j\theta_i) \cdot g_{k,i} \quad (8)$$

[Formula 9]

$$\sum_{i \in S1} a_i \cdot \exp(j\theta_i) \cdot g_{k,i} \equiv A_k \cdot \exp(j\Theta_k) \quad (9)$$

A uniform light amplitude modulation $g_0$ is set in a region other than the first region S1 (that is, the second region S2). In this case, the complex amplitude of the modulated light output from the i-th pixel region in the second region S2 is represented by the following Formula (10). The sum of the complex amplitudes of the modulated light output from all the pixel regions in the second region S2 is expressed by the following Formula (11). b in the right side of Formula (11) can be a real number.

[Formula 10]

$$x_i \cdot g_0 = a_i \cdot \exp(j\theta_i) \cdot g_0 \quad (10)$$

[Formula 11]

$$\sum_{i \in S2} a_i \cdot \exp(j\theta_i) \cdot g_0 \equiv b \quad (11)$$

The light intensity value I output from the photodetector 40 is represented by the following Formula (12), as the square of the absolute value of the sum of Formula (9) and Formula (11).

[Formula 12]

$$I = |A_k \cdot \exp(j\Theta_k) + b|^2 \quad (12)$$
$$= A_k^2 + b^2 + 2 \cdot A_k \cdot b \cdot \cos(\Theta_k)$$

When the light amplitude modulation pattern $g_{k,i}$ is set in the first region S1 and the light amplitude modulation in the second region S2 is set uniformly to the non-zero predetermined value $g_0$, the acquired light intensity value $I_{11}$ in this case is a value represented by Formula (12). When the light amplitude modulation pattern $g_{k,i}$ is set in the first region S1 and the light amplitude modulation in the second region S2 is set uniformly to zero, the acquired light intensity value ho in this case is $A_k^2$, and the value of $A_k$ is acquired. When the light amplitude modulation in the first region S1 is set uniformly to zero and the light amplitude modulation in the second region S2 is set uniformly to the predetermined value $g_0$, the acquired light intensity value $I_{01}$ in this case is $b^2$, and the value of b is acquired. Further, $\Theta_k$ is acquired from Formula (12) using these values of $I_{11}$, $A_k$, and b.

By sequentially setting the plurality of light amplitude modulation patterns $g_{k,i}$ in the first region S1, $A_k$ and $\Theta_k$ are acquired for each light amplitude modulation pattern $g_{k,i}$, and the simultaneous equations represented by the following Formula (13) are acquired. When the number of light amplitude modulation patterns to be set is equal to the number of pixel regions included in the first region S1, since Formula (13) is linear simultaneous equations, the solution $\{x_i\}$ is acquired using the inverse matrix of the matrix $\{g_{k,i}\}$. The solution $\{x_i\}$, that is, $\{a_i \exp(\theta_i)\}$ represents the complex amplitude image of the region of the object S corresponding to the first region S1. The amplitude image is $\{a_i\}$, and the phase image is $\{\theta_i\}$.

[Formula 13]

$$\sum_{i \in S1} g_{k,i} \cdot x_i = A_k \cdot \exp(j\Theta_k) \quad (13)$$

The processing in the second region image acquisition step following the first region image acquisition step is as follows. A plurality of light amplitude modulation patterns are sequentially set in the second region S2. The number of light amplitude modulation patterns to be set is preferably 32, which is the same number as the number of pixel regions included in the second region S2. The k-th light amplitude modulation pattern in the plurality of light amplitude modulation patterns set in the second region S2 is represented as $g_{k,i}$. The sum of the complex amplitudes of the modulated light output from all the pixel regions in the second region S2 is expressed by the following Formula (14).

[Formula 14]

$$\sum_{i \in S2} a_i \cdot \exp(j\theta_i) \cdot g_{k,i} \equiv A_k \cdot \exp(j\Theta_k) \qquad (14)$$

A uniform light amplitude modulation $g_0$ is set in a region other than the second region S2 (that is, the first region S1). The sum of the complex amplitudes of the modulated light output from all the pixel regions in the first region S1 is expressed by the following Formula (15).

[Formula 15]

$$\sum_{i \in S1} a_i \cdot \exp(j\theta_i) \cdot g_0 \equiv b \qquad (15)$$

The light intensity value I output from the photodetector 40 is represented by Formula similar to Formula (12), as the square of the absolute value of the sum of Formula (14) and Formula (15).

When the light amplitude modulation pattern $g_{k,i}$ is set in the second region S2 and the light amplitude modulation in the first region S1 is set uniformly to the non-zero predetermined value $g_0$, the acquired light intensity value $I_{11}$ in this case is a value represented by Formula similar to Formula (12). When the light amplitude modulation pattern $g_{k,i}$ is set in the second region S2 and the light amplitude modulation in the first region S1 is set uniformly to zero, the acquired light intensity value $I_{10}$ in this case is $A_k^2$, and the value of $A_k$ is acquired. When the light amplitude modulation in the second region S2 is set uniformly to zero and the light amplitude modulation in the first region S1 is set uniformly to the predetermined value $g_0$, the acquired light intensity value $I_{01}$ in this case is $b^2$, and the value of b is acquired. Further, $\Theta_k$ is acquired from Formula (12) using these values of $I_{11}$, $A_k$, and b.

By sequentially setting the plurality of light amplitude modulation patterns $g_{k,i}$ in the second region S2, $A_k$ and $\Phi_k$ are acquired for each light amplitude modulation pattern $g_{k,i}$, and the simultaneous equations represented by Formula similar to Formula (13) are acquired. When the number of light amplitude modulation patterns to be set is equal to the number of pixel regions included in the second region S2, since Formula (13) is linear simultaneous equations, the solution $\{x_i\}$ is acquired using the inverse matrix of the matrix $\{g_{k,i}\}$. The solution $\{x_i\}$, that is, $\{a_i, \exp(\theta_i)\}$ represents the complex amplitude image of the region of the object S corresponding to the second region S2. The amplitude image is $\{a_i\}$, and the phase image is $\{\theta_i\}$.

By the processing up to the above point, the complex amplitude image $\{x_i\}$ of the object S corresponding to both the first region and the second region can be acquired.

Figure 7:
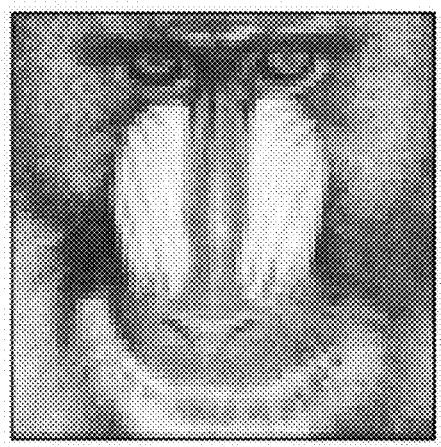
FIG. 7 includes (a) an original amplitude image used in a simulation, and (b) an amplitude image acquired in the simulation.
Figure 7:
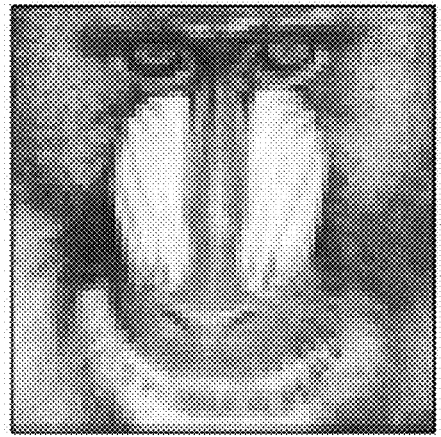
Figure 8:
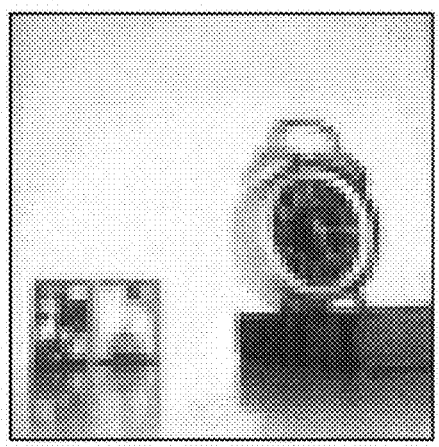
FIG. 8 includes (a) an original phase image used in the simulation, and (b) a phase image acquired in the simulation.
Figure 8:
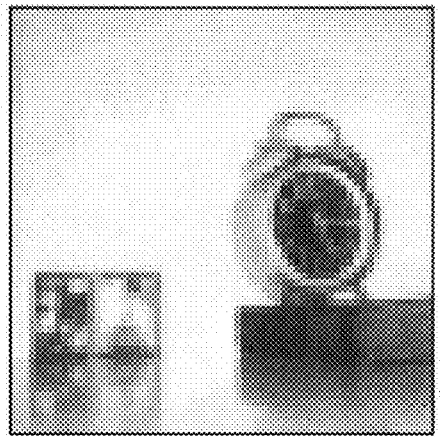

Next, simulation results will be described. In this case, as illustrated in FIG. 4, it is assumed that each pixel region is included in any one of the first region S1 and the second region S2 on the modulation plane of the spatial light modulator. It is assumed that the spatial light modulator is the DMD for performing binary light amplitude modulation. (a) in FIG. 7 shows an original amplitude image used in the simulation. (b) in FIG. 7 shows the amplitude image acquired in the simulation. (a) in FIG. 8 shows an original phase image used in the simulation. (b) in FIG. 8 shows the phase image acquired in the simulation.

As described above, according to the present embodiment, the complex amplitude image of the object can be acquired using all the pixel regions on the modulation plane of the spatial light modulator, and thus, the complex amplitude image of the object with high resolution can be acquired.

The imaging apparatus and the imaging method of the present invention are not limited to the embodiments and configuration examples described above, and various modifications are possible.

The imaging apparatus of the above embodiment includes (1) a light source for outputting coherent light; (2) a spatial light modulator having a modulation plane on which an image of an object irradiated with output light from the light source is formed, and for performing light amplitude modulation on input light in each of a plurality of pixel regions on the modulation plane based on a set light amplitude modulation pattern and outputting modulated light; (3) a Fourier transform optical system for forming a Fourier transform image of output light from the spatial light modulator; (4) a photodetector for selectively receiving zero-order light in the Fourier transform image to detect a light intensity and outputting a light intensity value; and (5) a control unit for controlling setting of the light amplitude modulation pattern on the modulation plane of the spatial light modulator and acquiring a complex amplitude image of the object based on the light amplitude modulation pattern and the light intensity value.

The imaging apparatus of the above embodiment includes (1) a light source for outputting coherent light; (2) a spatial light modulator having a modulation plane to which output light from the light source is input, and for performing light amplitude modulation on input light in each of a plurality of pixel regions on the modulation plane based on a set light amplitude modulation pattern and outputting modulated light; (3) a Fourier transform optical system for forming a Fourier transform image of an object irradiated with output light from the spatial light modulator; (4) a photodetector for selectively receiving zero-order light in the Fourier transform image to detect a light intensity and outputting a light intensity value; and (5) a control unit for controlling setting of the light amplitude modulation pattern on the modulation plane of the spatial light modulator and acquiring a complex amplitude image of the object based on the light amplitude modulation pattern and the light intensity value.

In the above imaging apparatus, the control unit is configured to (a) set a first region and a second region on the modulation plane of the spatial light modulator, (b) in an image acquisition of the first region (first region image acquisition step), sequentially set a plurality of light amplitude modulation patterns in the first region, and for each light amplitude modulation pattern, acquire the light intensity value by setting the light amplitude modulation pattern in the first region and setting the light amplitude modulation in a region other than the first region uniformly to a non-zero predetermined value, acquire the light intensity value by setting the light amplitude modulation pattern in the first region and setting the light amplitude modulation in the region other than the first region uniformly to zero, acquire the light intensity value by setting the light amplitude modulation in the first region uniformly to zero and setting the light amplitude modulation in the region other than the first region uniformly to the predetermined value, and acquire a complex amplitude image of a region of the object corresponding to the first region based on the acquired light intensity values and the light amplitude modulation pattern, and (c) in an image acquisition of the second region (second region image acquisition step), sequentially set a plurality of light amplitude modulation patterns in the second region, and for each light amplitude modulation pattern, acquire the light intensity value by setting the light amplitude modulation pattern in the second region and setting the light amplitude modulation in a region other than the second region uniformly to a non-zero predetermined value, acquire the light intensity value by setting the light amplitude modulation pattern in the second region and setting the light amplitude modulation in the region other than the second region uniformly to zero, acquire the light intensity value by setting the light amplitude modulation in the second region uniformly to zero and setting the light amplitude modulation in the region other than the second region uniformly to the predetermined value, and acquire a complex amplitude image of a region of the object corresponding to the second region based on the acquired light intensity values and the light amplitude modulation pattern.

In the above imaging apparatus, in the image acquisition of the first region (first region image acquisition step), the control unit may sequentially set the same number of light amplitude modulation patterns in the first region as the number of pixel regions included in the first region. Further, in the above imaging apparatus, in the image acquisition of the second region (second region image acquisition step), the control unit may sequentially set the same number of light amplitude modulation patterns in the second region as the number of pixel regions included in the second region.

In the above imaging apparatus, the spatial light modulator may perform binary light amplitude modulation. Further, in the above imaging apparatus, the spatial light modulator may be a digital micromirror device.

The above imaging apparatus may further include an aperture for selectively transmitting the zero-order light in the Fourier transform image formed by the Fourier transform optical system, and the photodetector may receive the light transmitted through the aperture.

The above imaging apparatus may further include an optical waveguide having an input end disposed at a position of the zero-order light in the Fourier transform image formed by the Fourier transform optical system, and for guiding light input to the input end and outputting the light from an output end, and the photodetector may receive the light output from the output end of the optical waveguide.

The imaging method of the above embodiment is a method for imaging an object using (1) a light source for outputting coherent light; (2) a spatial light modulator having a modulation plane on which an image of the object irradiated with output light from the light source is formed, and for performing light amplitude modulation on input light in each of a plurality of pixel regions on the modulation plane based on a set light amplitude modulation pattern and outputting modulated light; (3) a Fourier transform optical system for forming a Fourier transform image of output light from the spatial light modulator; and (4) a photodetector for selectively receiving zero-order light in the Fourier transform image to detect a light intensity and outputting a light intensity value.

The imaging method of the above embodiment is a method for imaging an object using (1) a light source for outputting coherent light; (2) a spatial light modulator having a modulation plane to which output light from the light source is input, and for performing light amplitude modulation on input light in each of a plurality of pixel regions on the modulation plane based on a set light amplitude modulation pattern and outputting modulated light; (3) a Fourier transform optical system for forming a Fourier transform image of the object irradiated with output light from the spatial light modulator; and (4) a photodetector for selectively receiving zero-order light in the Fourier transform image to detect a light intensity and outputting a light intensity value.

The above imaging method includes (a) a region setting step of setting a first region and a second region on the modulation plane of the spatial light modulator; (b) a first region image acquisition step of sequentially setting a plurality of light amplitude modulation patterns in the first region, and for each light amplitude modulation pattern, acquiring the light intensity value by setting the light amplitude modulation pattern in the first region and setting the light amplitude modulation in a region other than the first region uniformly to a non-zero predetermined value, acquiring the light intensity value by setting the light amplitude modulation pattern in the first region and setting the light amplitude modulation in the region other than the first region uniformly to zero, acquiring the light intensity value by setting the light amplitude modulation in the first region uniformly to zero and setting the light amplitude modulation in the region other than the first region uniformly to the predetermined value, and acquiring a complex amplitude image of a region of the object corresponding to the first region based on the acquired light intensity values and the light amplitude modulation pattern; and (c) a second region image acquisition step of sequentially setting a plurality of light amplitude modulation patterns in the second region, and for each light amplitude modulation pattern, acquiring the light intensity value by setting the light amplitude modulation pattern in the second region and setting the light amplitude modulation in a region other than the second region uniformly to a non-zero predetermined value, acquiring the light intensity value by setting the light amplitude modulation pattern in the second region and setting the light amplitude modulation in the region other than the second region uniformly to zero, acquiring the light intensity value by setting the light amplitude modulation in the second region uniformly to zero and setting the light amplitude modulation in the region other than the second region uniformly to the predetermined value, and acquiring a complex amplitude image of a region of the object corresponding to the second region based on the acquired light intensity values and the light amplitude modulation pattern.

In the above imaging method, in the first region image acquisition step, the same number of light amplitude modulation patterns as the number of pixel regions included in the first region may be sequentially set in the first region. Further, in the above imaging method, in the second region image acquisition step, the same number of light amplitude modulation patterns as the number of pixel regions included in the second region may be sequentially set in the second region.

In the above imaging method, the spatial light modulator may perform binary light amplitude modulation. Further, in the above imaging method, the spatial light modulator may be a digital micromirror device.

In the above imaging method, using an aperture for selectively transmitting the zero-order light in the Fourier transform image formed by the Fourier transform optical system, the light transmitted through the aperture may be received by the photodetector.

In the above imaging method, using an optical waveguide having an input end disposed at a position of the zero-order light in the Fourier transform image formed by the Fourier transform optical system, and for guiding light input to the input end and outputting the light from an output end, the light output from the output end of the optical waveguide may be received by the photodetector.

INDUSTRIAL APPLICABILITY

The present invention can be used as an imaging apparatus and an imaging method capable of acquiring a complex amplitude image of an object with high resolution using a spatial light modulator and a photodetector.

REFERENCE SIGNS LIST 1-3—imaging apparatus, 10—light source, 21, 22—spatial light modulator, 30—Fourier transform optical system, 40—photodetector, 50—control unit, 60—beam splitter, 70—aperture, 80—optical fiber, S—object.

The invention claimed is:
1. An imaging apparatus comprising:
a light source configured to output coherent light;
a spatial light modulator having a modulation plane on which an image of an object irradiated with output light from the light source is formed, and configured to perform light amplitude modulation on input light in each of a plurality of pixel regions on the modulation plane based on a set light amplitude modulation pattern and output modulated light;
a Fourier transform optical system configured to form a Fourier transform image of output light from the spatial light modulator;
a photodetector configured to selectively receive zero-order light in the Fourier transform image to detect a light intensity and output a light intensity value; and
a control unit configured to control setting of the light amplitude modulation pattern on the modulation plane of the spatial light modulator and acquire a complex amplitude image of the object based on the light amplitude modulation pattern and the light intensity value, wherein
the control unit is configured to:
set a first region and a second region on the modulation plane of the spatial light modulator,
in an image acquisition of the first region, sequentially set a plurality of light amplitude modulation patterns in the first region, and for each light amplitude modulation pattern, acquire the light intensity value by setting the light amplitude modulation pattern in the first region and setting the light amplitude modulation in a region other than the first region uniformly to a non-zero predetermined value, acquire the light intensity value by setting the light amplitude modulation pattern in the first region and setting the light amplitude modulation in the region other than the first region uniformly to zero, acquire the light intensity value by setting the light amplitude modulation in the first region uniformly to zero and setting the light amplitude modulation in the region other than the first region uniformly to the predetermined value, and acquire a complex amplitude image of a region of the object corresponding to the first region based on the acquired light intensity values and the light amplitude modulation pattern, and
in an image acquisition of the second region, sequentially set a plurality of light amplitude modulation patterns in the second region, and for each light amplitude modulation pattern, acquire the light intensity value by setting the light amplitude modulation pattern in the second region and setting the light amplitude modulation in a region other than the second region uniformly to a non-zero predetermined value, acquire the light intensity value by setting the light amplitude modulation pattern in the second region and setting the light amplitude modulation in the region other than the second region uniformly to zero, acquire the light intensity value by setting the light amplitude modulation in the second region uniformly to zero and setting the light amplitude modulation in the region other than the second region uniformly to the predetermined value, and acquire a complex amplitude image of a region of the object corresponding to the second region based on the acquired light intensity values and the light amplitude modulation pattern.

2. The imaging apparatus according to claim 1, wherein, in the image acquisition of the first region, the control unit is configured to sequentially set the same number of light amplitude modulation patterns in the first region as the number of pixel regions included in the first region.

3. The imaging apparatus according to claim 1, wherein, in the image acquisition of the second region, the control unit is configured to sequentially set the same number of light amplitude modulation patterns in the second region as the number of pixel regions included in the second region.

4. The imaging apparatus according to claim 1, wherein the spatial light modulator performs is configured to perform binary light amplitude modulation.

5. The imaging apparatus according to claim 4, wherein the spatial light modulator is a digital micromirror device.

6. The imaging apparatus according to claim 1, further comprising an aperture configured to selectively transmit the zero-order light in the Fourier transform image formed by the Fourier transform optical system, wherein
the photodetector is configured to receive the light transmitted through the aperture.

7. The imaging apparatus according to claim 1, further comprising an optical waveguide having an input end disposed at a position of the zero-order light in the Fourier transform image formed by the Fourier transform optical system, and configured to guide light input to the input end and output the light from an output end, wherein
the photodetector is configured to receive the light output from the output end of the optical waveguide.

8. An imaging apparatus comprising:
a light source configured to output coherent light;
a spatial light modulator having a modulation plane to which output light from the light source is input, and configured to perform light amplitude modulation on input light in each of a plurality of pixel regions on the modulation plane based on a set light amplitude modulation pattern and output modulated light;
a Fourier transform optical system configured to form a Fourier transform image of an object irradiated with output light from the spatial light modulator;
a photodetector configured to selectively receive zero-order light in the Fourier transform image to detect a light intensity and output a light intensity value; and
a control unit configured to control setting of the light amplitude modulation pattern on the modulation plane of the spatial light modulator and acquire a complex amplitude image of the object based on the light amplitude modulation pattern and the light intensity value, wherein the control unit is configured to:
set a first region and a second region on the modulation plane of the spatial light modulator,
in an image acquisition of the first region, sequentially set a plurality of light amplitude modulation patterns in the first region, and for each light amplitude modulation pattern, acquire the light intensity value by setting the light amplitude modulation pattern in the first region and setting the light amplitude modulation in a region other than the first region uniformly to a non-zero predetermined value, acquire the light intensity value by setting the light amplitude modulation pattern in the first region and setting the light amplitude modulation in the region other than the first region uniformly to zero, acquire the light intensity value by setting the light amplitude modulation in the first region uniformly to zero and setting the light amplitude modulation in the region other than the first region uniformly to the predetermined value, and acquire a complex amplitude image of a region of the object corresponding to the first region based on the acquired light intensity values and the light amplitude modulation pattern, and
in an image acquisition of the second region, sequentially set a plurality of light amplitude modulation patterns in the second region, and for each light amplitude modulation pattern, acquire the light intensity value by setting the light amplitude modulation pattern in the second region and setting the light amplitude modulation in a region other than the second region uniformly to a non-zero predetermined value, acquire the light intensity value by setting the light amplitude modulation pattern in the second region and setting the light amplitude modulation in the region other than the second region uniformly to zero, acquire the light intensity value by setting the light amplitude modulation in the second region uniformly to zero and setting the light amplitude modulation in the region other than the second region uniformly to the predetermined value, and acquire a complex amplitude image of a region of the object corresponding to the second region based on the acquired light intensity values and the light amplitude modulation pattern.

9. The imaging apparatus according to claim 8, wherein, in the image acquisition of the first region, the control unit is configured to sequentially set the same number of light amplitude modulation patterns in the first region as the number of pixel regions included in the first region.

10. The imaging apparatus according to claim 8, wherein, in the image acquisition of the second region, the control unit is configured to sequentially set the same number of light amplitude modulation patterns in the second region as the number of pixel regions included in the second region.

11. The imaging apparatus according to claim 8, wherein the spatial light modulator is configured to perform binary light amplitude modulation.

12. The imaging apparatus according to claim 11, wherein the spatial light modulator is a digital micromirror device.

13. The imaging apparatus according to claim 8, further comprising an aperture configured to selectively transmit the zero-order light in the Fourier transform image formed by the Fourier transform optical system, wherein
the photodetector is configured to receive the light transmitted through the aperture.

14. The imaging apparatus according to claim 8, further comprising an optical waveguide having an input end disposed at a position of the zero-order light in the Fourier transform image formed by the Fourier transform optical system, and configured to guide light input to the input end and output the light from an output end, wherein
the photodetector is configured to receive the light output from the output end of the optical waveguide.

15. An imaging method for imaging an object using:
a light source configured to output coherent light;
a spatial light modulator having a modulation plane on which an image of the object irradiated with output light from the light source is formed, and configured to perform light amplitude modulation on input light in each of a plurality of pixel regions on the modulation plane based on a set light amplitude modulation pattern and output modulated light;
a Fourier transform optical system configured to form a Fourier transform image of output light from the spatial light modulator; and
a photodetector configured to selectively receive zero-order light in the Fourier transform image to detect a light intensity and output a light intensity value,
the method comprising:
a region setting step of setting a first region and a second region on the modulation plane of the spatial light modulator;
a first region image acquisition step of sequentially setting a plurality of light amplitude modulation patterns in the first region, and for each light amplitude modulation pattern, acquiring the light intensity value by setting the light amplitude modulation pattern in the first region and setting the light amplitude modulation in a region other than the first region uniformly to a non-zero predetermined value, acquiring the light intensity value by setting the light amplitude modulation pattern in the first region and setting the light amplitude modulation in the region other than the first region uniformly to zero, acquiring the light intensity value by setting the light amplitude modulation in the first region uniformly to zero and setting the light amplitude modulation in the region other than the first region uniformly to the predetermined value, and acquiring a complex amplitude image of a region of the object corresponding to the first region based on the acquired light intensity values and the light amplitude modulation pattern; and
a second region image acquisition step of sequentially setting a plurality of light amplitude modulation patterns in the second region, and for each light amplitude modulation pattern, acquiring the light intensity value by setting the light amplitude modulation pattern in the second region and setting the light amplitude modulation in a region other than the second region uniformly to a non-zero predetermined value, acquiring the light intensity value by setting the light amplitude modulation pattern in the second region and setting the light amplitude modulation in the region other than the second region uniformly to zero, acquiring the light intensity value by setting the light amplitude modulation in the second region uniformly to zero and setting the light amplitude modulation in the region other than the second region uniformly to the predetermined value, and acquiring a complex amplitude image of a region of the object corresponding to the second region based on the acquired light intensity values and the light amplitude modulation pattern.

16. The imaging method according to claim 15, wherein, in the first region image acquisition step, the same number of light amplitude modulation patterns as the number of pixel regions included in the first region are sequentially set in the first region.

17. The imaging method according to claim 15, wherein, in the second region image acquisition step, the same number of light amplitude modulation patterns as the number of pixel regions included in the second region are sequentially set in the second region.

18. The imaging method according to claim 15, wherein the spatial light modulator performs is configured to perform binary light amplitude modulation.

19. The imaging method according to claim 18, wherein the spatial light modulator is a digital micromirror device.

20. The imaging method according to claim 15, wherein, using an aperture configured to selectively transmit the zero-order light in the Fourier transform image formed by the Fourier transform optical system,
the light transmitted through the aperture is received by the photodetector.

21. The imaging method according to claim 15, wherein, using an optical waveguide having an input end disposed at a position of the zero-order light in the Fourier transform image formed by the Fourier transform optical system, and configured to guide light input to the input end and output the light from an output end,
the light output from the output end of the optical waveguide is received by the photodetector.

22. An imaging method for imaging an object using:
a light source configured to output coherent light;
a spatial light modulator having a modulation plane to which output light from the light source is input, and configured to perform light amplitude modulation on input light in each of a plurality of pixel regions on the modulation plane based on a set light amplitude modulation pattern and output modulated light;
a Fourier transform optical system configured to form a Fourier transform image of the object irradiated with output light from the spatial light modulator; and
a photodetector configured to selectively receive zero-order light in the Fourier transform image to detect a light intensity and output a light intensity value,
the method comprising:
a region setting step of setting a first region and a second region on the modulation plane of the spatial light modulator;
a first region image acquisition step of sequentially setting a plurality of light amplitude modulation patterns in the first region, and for each light amplitude modulation pattern, acquiring the light intensity value by setting the light amplitude modulation pattern in the first region and setting the light amplitude modulation in a region other than the first region uniformly to a non-zero predetermined value, acquiring the light intensity value by setting the light amplitude modulation pattern in the first region and setting the light amplitude modulation in the region other than the first region uniformly to zero, acquiring the light intensity value by setting the light amplitude modulation in the first region uniformly to zero and setting the light amplitude modulation in the region other than the first region uniformly to the predetermined value, and acquiring a complex amplitude image of a region of the object corresponding to the first region based on the acquired light intensity values and the light amplitude modulation pattern; and
a second region image acquisition step of sequentially setting a plurality of light amplitude modulation patterns in the second region, and for each light amplitude modulation pattern, acquiring the light intensity value by setting the light amplitude modulation pattern in the second region and setting the light amplitude modulation in a region other than the second region uniformly to a non-zero predetermined value, acquiring the light intensity value by setting the light amplitude modulation pattern in the second region and setting the light amplitude modulation in the region other than the second region uniformly to zero, acquiring the light intensity value by setting the light amplitude modulation in the second region uniformly to zero and setting the light amplitude modulation in the region other than the second region uniformly to the predetermined value, and acquiring a complex amplitude image of a region of the object corresponding to the second region based on the acquired light intensity values and the light amplitude modulation pattern.

23. The imaging method according to claim 22, wherein, in the first region image acquisition step, the same number of light amplitude modulation patterns as the number of pixel regions included in the first region are sequentially set in the first region.

24. The imaging method according to claim 22, wherein, in the second region image acquisition step, the same number of light amplitude modulation patterns as the number of pixel regions included in the second region are sequentially set in the second region.

25. The imaging method according to claim 22, wherein the spatial light modulator is configured to perform binary light amplitude modulation.

26. The imaging method according to claim 25, wherein the spatial light modulator is a digital micromirror device.

27. The imaging method according to claim 22, wherein, using an aperture configured to selectively transmit the zero-order light in the Fourier transform image formed by the Fourier transform optical system,
the light transmitted through the aperture is received by the photodetector.

28. The imaging method according to claim 22, wherein, using an optical waveguide having an input end disposed at a position of the zero-order light in the Fourier transform image formed by the Fourier transform optical system, and configured to guide light input to the input end and output the light from an output end,
the light output from the output end of the optical waveguide is received by the photodetector.

* * * * *